(12) United States Patent
Lu

(10) Patent No.: US 10,165,404 B2
(45) Date of Patent: Dec. 25, 2018

(54) METHOD FOR TRIGGERING OPERATION AND PORTABLE ELECTRONIC DEVICE

(71) Applicant: Huawei Technologies Co., Ltd., Shenzhen (CN)

(72) Inventor: Chenxi Lu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/575,677

(22) PCT Filed: May 21, 2015

(86) PCT No.: PCT/CN2015/079494
§ 371 (c)(1),
(2) Date: Nov. 20, 2017

(87) PCT Pub. No.: WO2016/183841
PCT Pub. Date: Nov. 24, 2016

(65) Prior Publication Data
US 2018/0288566 A1 Oct. 4, 2018

(51) Int. Cl.
*H04W 4/021* (2018.01)
*H04L 29/08* (2006.01)

(52) U.S. Cl.
CPC ............. *H04W 4/022* (2013.01); *H04L 67/18* (2013.01)

(58) Field of Classification Search
CPC .... G06Q 10/0631; H04W 4/21; H04W 64/00; G06F 17/30241
USPC ........ 455/456.3, 456.1, 404.2, 457; 711/137; 709/203, 232; 705/14.58, 14.57
See application file for complete search history.

(56) References Cited

U.S. PATENT DOCUMENTS

| 8,874,129 | B2 * | 10/2014 | Forutanpour | ....... G06F 3/04883 |
| | | | | 455/456.1 |
| 2002/0198003 | A1 * | 12/2002 | Klapman | ................ H04W 4/02 |
| | | | | 455/456.1 |
| 2008/0218405 | A1 | 9/2008 | Eckhart | |

(Continued)

FOREIGN PATENT DOCUMENTS

| CN | 103947229 A | 7/2014 |
| CN | 104350769 A | 2/2015 |
| CN | 104487805 A | 4/2015 |

OTHER PUBLICATIONS

Foreign Communication From a Counterpart Application, PCT Application No. PCT/CN2015/079494, English Translation of International Search Report dated Jan. 20, 2016, 2 pages.

(Continued)

*Primary Examiner* — Kiet M Doan
(74) *Attorney, Agent, or Firm* — Conley Rose, P.C.

(57) ABSTRACT

A method includes obtaining a first speed and a first location of a portable electronic device that are at a first time point, determining, according to the first speed and a time difference between a second time point and the first time point, a geo-fencing centering on a second location, where the geo-fencing is a virtual fence including points whose distances to the second location are equal to a reference distance, the reference distance is not greater than a product obtained by multiplying the first speed by the time difference, and the second time point and the second location are preset, and triggering a preset operation when the first location is outside the geo-fencing.

17 Claims, 11 Drawing Sheets

(56) References Cited

U.S. PATENT DOCUMENTS

| | | |
|---|---|---|
| 2011/0148634 A1 | 6/2011 | Putz |
| 2011/0153143 A1 | 6/2011 | O'Neil et al. |
| 2012/0310527 A1 | 12/2012 | Yariv et al. |
| 2013/0030931 A1* | 1/2013 | Moshfeghi ............... G01S 19/48 705/16 |
| 2013/0099977 A1 | 4/2013 | Sheshadri et al. |
| 2013/0178233 A1 | 7/2013 | McCoy et al. |
| 2013/0326137 A1 | 12/2013 | Bilange et al. |
| 2014/0164118 A1 | 6/2014 | Polachi |
| 2014/0351411 A1 | 11/2014 | Woods et al. |
| 2015/0215736 A1 | 7/2015 | Josefiak et al. |

OTHER PUBLICATIONS

Foreign Communication From a Counterpart Application, PCT Application No. PCT/CN2015/079494, English Translation of Written Opinion dated Jan. 20, 2016, 5 pages.

Foreign Communication From a Counterpart Application, European Application No. 15892220.3, Extended European Search Report dated Mar. 21, 2018, 9 pages.

* cited by examiner

METHOD FOR TRIGGERING OPERATION AND PORTABLE ELECTRONIC DEVICE

CROSS-REFERENCE TO RELATED APPLICATION

This application is a U.S. National Stage of International Patent Application No. PCT/CN2015/079494 filed May 21, 2015, which is hereby incorporated by reference in its entirety.

TECHNICAL FIELD

The present disclosure relates to the field of communications technologies, and in particular, to a method for triggering an operation and a portable electronic device.

BACKGROUND

A geo-fencing built in a portable electronic device is a preset virtual perimeter around a geographical location. When the portable electronic device enters or leaves the virtual perimeter, the geo-fencing triggers a preset event such as, outputting a notification. In other approaches, the geo-fencing built in the portable electronic device is preset by a user, and the portable electronic device cannot automatically set the geo-fencing.

SUMMARY

Embodiments of the present disclosure provide a method for triggering an operation and a portable electronic device in order to resolve a problem that a geo-fencing cannot be adjusted automatically in some particular scenarios.

To resolve the foregoing technical problem, the present disclosure discloses the following technical solutions.

According to a first aspect, a method for triggering an operation is provided, including obtaining a first speed of a portable electronic device and a first location of the portable electronic device that are at a first time point, determining, according to the first speed and a time difference between a second time point and the first time point, a geo-fencing centering on a second location, where the geo-fencing is a virtual fence including points whose distances to the second location are equal to a reference distance, the reference distance is not greater than a product obtained by multiplying the first speed by the time difference, and the second time point and the second location are preset, determining a location relationship between the first location and the geo-fencing, and triggering a preset operation when determining that the first location is outside the geo-fencing.

With reference to the first aspect, in a first possible implementation manner of the first aspect, the points whose distances to the second location are equal to the reference distance include points whose straight-line distances to the second location are equal to the reference distance, or points whose actual distances to the second location are equal to the reference distance.

With reference to the first aspect or the first possible implementation manner of the first aspect, in a second possible implementation manner of the first aspect, the method further includes determining that the portable electronic device receives an updated second location, and replacing the preset second location with the updated second location.

With reference to the first aspect or the first possible implementation manner of the first aspect, in a third possible implementation manner of the first aspect, the method further includes determining that the portable electronic device receives an updated second time point, and replacing the preset second time point with the updated second time point.

With reference to any one of the first aspect or the first to the third possible implementation manners of the first aspect, in a fourth possible implementation manner of the first aspect, triggering a preset operation when determining that the first location is outside the geo-fencing includes triggering a preset first operation when determining that the first location is outside the geo-fencing and a distance between the first location and the geo-fencing is not greater than a preset threshold, or triggering a preset second operation when the first location is outside the geo-fencing and a distance between the first location and the geo-fencing is greater than a preset threshold.

According to a second aspect, a portable electronic device is provided, including an obtaining module configured to obtain a first speed of the portable electronic device and a first location of the portable electronic device that are at a first time point, a first determining module configured to determine, according to the first speed and a time difference between a second time point and the first time point, a geo-fencing centering on a second location, where the geo-fencing is a virtual fence including points whose distances to the second location are equal to a reference distance, the reference distance is not greater than a product obtained by multiplying the first speed by the time difference, and the second time point and the second location are preset, a second determining module configured to determine a location relationship between the first location and the geo-fencing, and a trigger module configured to trigger a preset operation when the first location is outside the geo-fencing.

With reference to the second aspect, in a first possible implementation manner of the second aspect, the points whose distances to the second location are equal to the reference distance include points whose straight-line distances to the second location are equal to the reference distance, or points whose actual distances to the second location are equal to the reference distance.

With reference to the second aspect or the first possible implementation manner of the second aspect, in a second possible implementation manner of the second aspect, the portable electronic device further includes a first update module configured to determine that the portable electronic device receives an updated second location, and replace the preset second location with the updated second location.

With reference to the second aspect or the first possible implementation manner of the second aspect, in a third possible implementation manner of the second aspect, the portable electronic device further includes a second update module configured to determine that the portable electronic device receives an updated second time point, and replace the preset second time point with the updated second time point.

With reference to any one of the second aspect or the first to the third possible implementation manners of the second aspect, in a fourth possible implementation manner of the second aspect, the trigger module includes a first trigger module configured to trigger a preset first operation when the first location is outside the geo-fencing and a distance between the first location and the geo-fencing is not greater than a preset threshold, and a second trigger module configured to trigger a preset second operation when the first location is outside the geo-fencing and a distance between the first location and the geo-fencing is greater than a preset threshold.

According to a third aspect, a portable electronic device is provided, including a processor, a memory, and a system bus, where the memory is connected to the processor using the system bus. The memory is configured to store a computer execution instruction, and the processor is configured to run the computer execution instruction to execute the method according to any one of the first aspect or the first possible implementation manner to the fourth possible implementation manner of the first aspect.

According to a fourth aspect, a non-transitory computer readable storage medium is provided, including a machine readable instruction stored in the medium, where when executed by a portable electronic device, the machine readable instruction enables the portable electronic device to execute the method according to any one of the first aspect or the first possible implementation manner to the fourth possible implementation manner of the first aspect.

In the embodiments of the present disclosure, according to a first speed of a portable electronic device and a first location of the portable electronic device that are obtained at a time point, and a preset second time point and second location, a reference distance between the portable electronic device and the second location may be dynamically calculated, and a geo-fencing centering on the second location is further determined, where the geo-fencing is a virtual fence including points whose distances to the second location are equal to the reference distance, and the reference distance is not greater than a product obtained by multiplying the first speed by a time difference. In this way, in a particular scenario (for example, a scenario in which a user holding the portable electronic device needs to gather at a location at a time point), a location relationship between the portable electronic device and the geo-fencing can be determined more accurately, thereby more accurately pushing a message or sending a prompt message.

BRIEF DESCRIPTION OF DRAWINGS

To describe the technical solutions in the embodiments of the present disclosure more clearly, the following briefly introduces the accompanying drawings required for describing the embodiments. A person of ordinary skill in the art may still derive other drawings from these accompanying drawings without creative efforts.

DESCRIPTION OF EMBODIMENTS

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Figure 1:
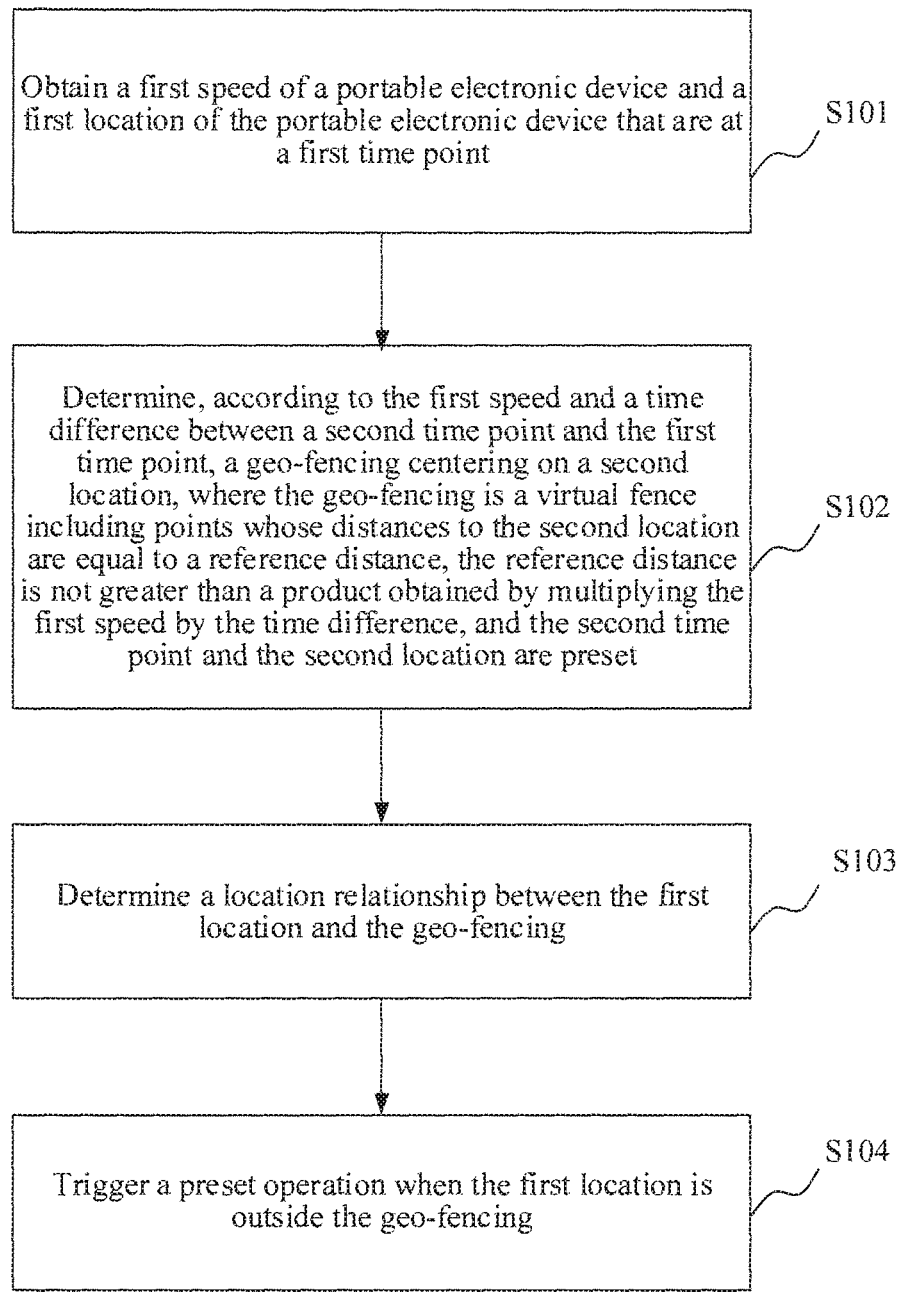
FIG. 1 is a flowchart of a method for triggering an operation according to an embodiment of the present disclosure.

FIG. 1 is a flowchart of a method for triggering an operation according to an embodiment of the present disclosure. The method is executed by a portable electronic device (such as a mobile phone). This embodiment is mainly applied to a scenario in which a user holding the portable electronic device needs to gather at a location at a time point. It should be noted that "first" and "second" involved in this specification are merely used for distinguishing, and do not have meanings in sequence, size, or other aspects.

Referring to FIG. 1, the method includes the following steps.

Step S101: Obtain a first speed of a portable electronic device and a first location of the portable electronic device that are at a first time point.

A process in which the speed of the portable electronic device and the location of the portable electronic device are obtained may be consecutive, or may be periodic. This is not limited in this embodiment. The first speed and the first location are obtained by the portable electronic device at the first time point. The first time point may be represented using a 24 hour system, for example, 13:08. The first speed is generally measured in meters per second (m/s). The first location is generally represented using coordinates. A specific coordinate system is not limited in this specification.

Step S102: Determine, according to the first speed and a time difference between a second time point and the first time point, a geo-fencing centering on a second location, where the geo-fencing is a virtual fence including points whose distances to the second location are equal to a reference distance, the reference distance is not greater than a product obtained by multiplying the first speed by the time difference, and the second time point and the second location are preset.

It should be understood that the time difference is generally measured in seconds. In addition, determining in the "determining, according to the first speed and a time difference between a second time point and the first time point, a geo-fencing centering on a second location" may be understood as acquiring, obtaining, or calculating. This is not limited herein. In addition, an external manifestation of the "determining a geo-fencing centering on a second location" on the portable electronic device is a virtual fence that includes the points whose distances to the second location are equal to the reference distance and that is displayed on a display of the portable electronic device. Optionally, the geo-fencing centering on the second location may not be displayed on the display of the portable electronic device.

Step S103: Determine a location relationship between the first location and the geo-fencing.

Step S104: Trigger a preset operation when the first location is outside the geo-fencing.

It should be understood that the preset operation includes but is not limited to outputting a prompt message. The prompt message may be output in a form of at least one of a sound, vibration, voice playing, or text display or any combination thereof. For example, if it is found that the first location is outside the geo-fencing, the prompt message may be output to remind the user that a location for gathering cannot be reached on time.

The triggering a preset operation when the first location is outside the geo-fencing includes triggering a preset first operation when determining that the first location is outside the geo-fencing and a distance between the first location and the geo-fencing is not greater than a preset threshold, or triggering a preset second operation when the first location is outside the geo-fencing and a distance between the first location and the geo-fencing is greater than a preset threshold.

It should be understood that the first operation and the second operation are different, to indicate different levels of prompt messages. For example, the first operation is ringing and displaying an image and a text, and the second operation is ringing, vibrating, and displaying an image and a text.

Figure 2:
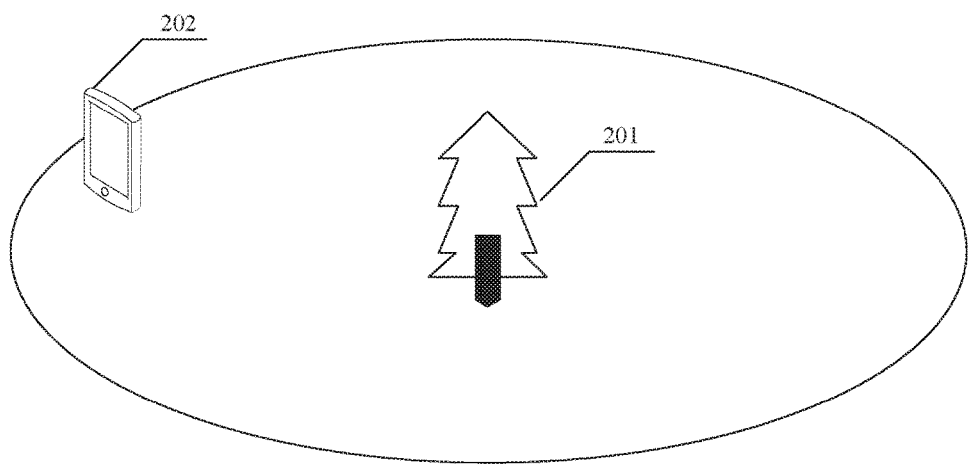
FIG. 2 is a schematic diagram of a target location according to an embodiment of the present disclosure.
Figure 3:
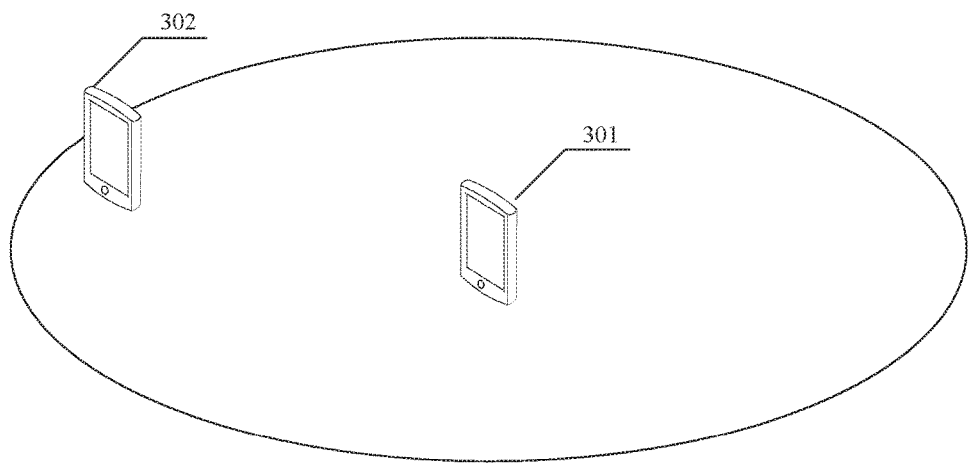
FIG. 3 is a schematic diagram of a target location according to an embodiment of the present disclosure.

Setting a specific scenario in which tourists go sightseeing in a park as an example, a guide may first set a time point for gathering (that is, the second time point, which may also be referred to as a target time point) and a location for gathering (that is, the second location, which may also be referred to as a target location), and then send the time point for gathering and the location for gathering to mobile phones of the tourists, or the tourists may set the time point for gathering and the location for gathering by themselves on their mobile phones (a setting method is not limited, for example, enabling a geo-fencing, and setting the time point for gathering and the location for gathering at a corresponding location). For example, the time point for gathering may be 15:30, and the location for gathering is a big tree in front of a gate of the park. Referring to FIG. 2, a big tree 201 is the target location, and 202 is a mobile phone of a tourist. Alternatively, the location for gathering may be a location of a mobile phone held by the guide. Referring to FIG. 3, a location of a mobile phone 301 of the guide is the location for gathering, and 302 is a mobile phone of a tourist.

In this embodiment of the present disclosure, if the portable electronic device is currently in the geo-fencing, it means that the portable electronic device may reach the target location at the target time point when setting out at a current speed from a current location, and the geo-fencing does not need to trigger an alarm, a prompt message, or the like.

Still using the foregoing scenario as an example, it is assumed that the time point for gathering is 15:30. When a trigger condition is satisfied, for example, a preset interval (for example, one hour) 14:30 before the time point for gathering is reached, or a message that is sent by the mobile phone of the guide and that asks the tourists to be ready for gathering is received, or the target time point and the target location are set completely, the geo-fencing centering on the target location starts to work. Because different tourists generally move at different speeds, and a moving speed of one tourist may also change, the geo-fencing centering on the target location is not stationary but changes dynamically. In this way, it can be ensured that the user holding the portable electronic device can reach the place for gathering before the time point for gathering, that is, when a speed of the user holding the portable electronic device is excessively slow, a location of the portable electronic device is outside the geo-fencing, and the geo-fencing triggers the preset operation, such as outputting a prompt message.

In this embodiment or some other embodiments of the present disclosure, the points whose distances to the second location are equal to the reference distance may include points whose straight-line distances to the second location are equal to the reference distance, or points whose actual distances to the second location are equal to the reference distance.

For example, if a map is put aside and impact of a factor such as a specific geographical environment is not considered, a distance to the target location (that is, the second location) may be considered as a straight line, and the geo-fencing is a circle having the target location as a center of the circle and the reference distance as a radius. If impact of a factor such as a specific geographical environment is considered, for example, the tourist needs to detour many buildings and take some winding roads to reach the target location, an actual distance to the target location is a curve, and the geo-fencing is an irregular curve (which is usually a closed curve, or may be a non-closed curve) centering on the target location.

The following provides a description using an example in which the distance is a straight-line.

Figure 4:
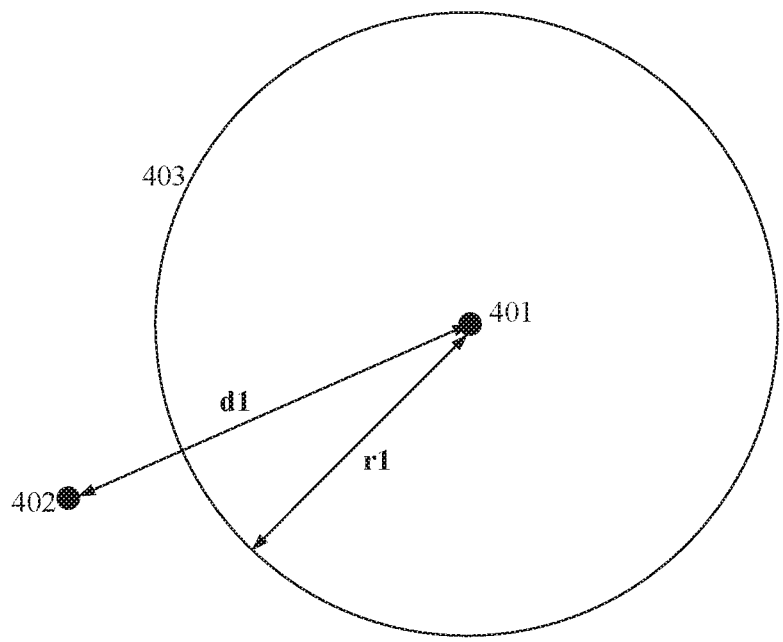
FIG. 4 is a schematic diagram of a geo-fencing according to an embodiment of the present disclosure.

Referring to FIG. 4, in FIG. 4, 401 is the target location, that is, the location for gathering, and 402 is a mobile phone held by a tourist. Currently, there are 30 minutes left to the time point for gathering. At this time, the mobile phone 402 may calculate, by means of positioning itself, a distance d1 between itself and the target location 401 is 4000 meters, and the mobile phone 402 may further calculate a moving speed v1 of itself is 100 meters/minute. Assuming that the tourist is in a range that has a distance of r1=100*30=3000 (meters) to the target location, the tourist may reach the target location at the target time point such that 3000 meters is the reference distance, that is, the radius of the geo-fencing. However, currently, the tourist is outside a perimeter 403 of the geo-fencing (i.e., 4000 meters>3000 meters). Therefore, the mobile phone 402 outputs a prompt message to the tourist to remind the tourist that at the current speed v1 and the distance d1, the tourist cannot reach the location 401 for gathering at the time point for gathering.

Figure 5:
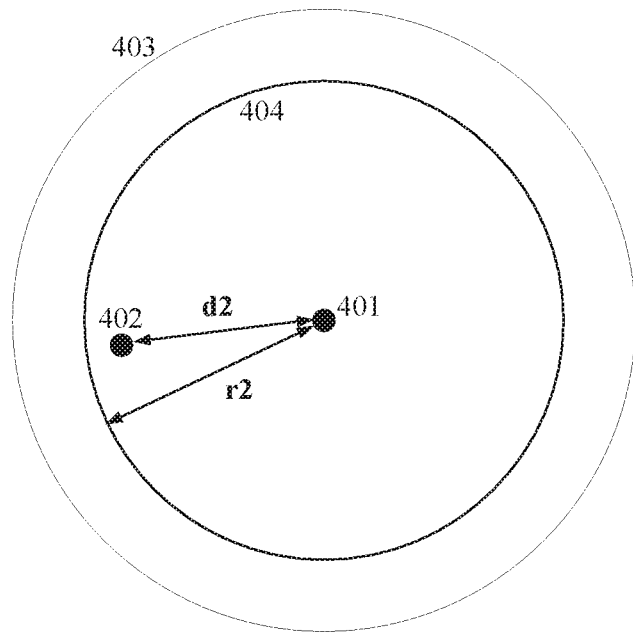
FIG. 5 is a schematic diagram of a geo-fencing according to an embodiment of the present disclosure.

After a period of time, referring to FIG. 5, a new radius r2 of the geo-fencing may be calculated according to the speed of the tourist and a remaining time (that is, the time difference), and the perimeter of the geo-fencing also changes from 403 to 404. At this time, because the tourist previously quickens paces, currently, a distance d2 to the target location is less than r2. In other words, the tourist is in the geo-fencing, and the mobile phone 402 does not output a prompt message.

In this embodiment or some other embodiments of the present disclosure, triggering a preset operation may include sending different prompt messages according to different location relationships between the first location and the geo-fencing.

For example, if a current location (that is, the first location) of the portable electronic device is outside the geo-fencing, but a distance to the target location (that is, the second location) is less than a first threshold (for example, twice the reference distance), the portable electronic device may send first prompt information of a relatively low priority. If not only the current location is outside the geo-fencing, but also the distance to the target location is greater than the first threshold, the portable electronic device may send second prompt information of a relatively high priority, and in this case, the portable electronic device may further push location coordinates of itself and the prompt information to a server or the mobile phone held by the guide that serves as a central control device.

It should be noted that the prompt message involved in this specification includes but is not limited to an arbitrary combination of a sound, a message, vibration, and a text.

In addition, how the portable electronic device obtains the first speed is not limited in the present disclosure. The first speed may be an instantaneous speed of the portable electronic device at the first time point, or may be an average speed obtained according to a moving history of the portable electronic device.

For example, obtaining a first speed of the portable electronic device that is at a first time point may include calculating an average speed of the portable electronic device in each two neighboring historical locations, and setting a maximum average speed as the first speed, or setting an average speed obtained by dividing a moving distance of the portable electronic device in preset duration by the preset duration, as the first speed.

Figure 6:
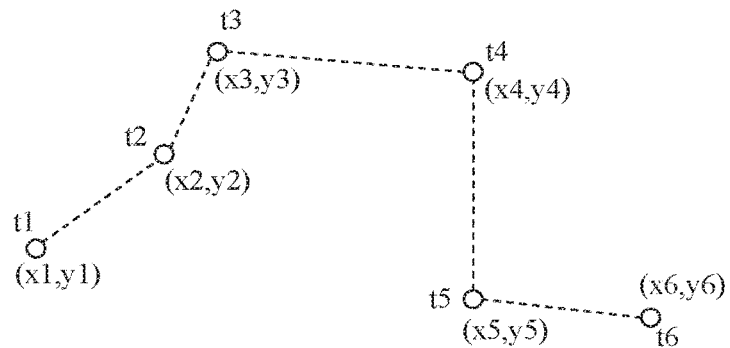
FIG. 6 is a schematic diagram of a moving process of a portable electronic device according to an embodiment of the present disclosure.

For example, referring to FIG. 6, the portable electronic device is a mobile phone, and t1 at (x1,y1), t2 at (x2,y2), t3 at (x3,y3), t4 at (x4,y4), t5 at (x5,y5), and t6 at (x6,y6) in FIG. 6 are different location points and corresponding coordinates of the mobile phone in a moving process. The average speed may be calculated using distances between the location points and moving time of the mobile phone. In addition, data of excessively slow moving speeds may further be sorted out (a user may have a stopover in a region, and a speed of the user in the region cannot represent a typical moving speed of the user), and the average speed is obtained using remaining data.

In addition, the method may further include determining whether the first speed is less than a preset minimum speed after the first speed is obtained, and setting the preset minimum speed as the first speed if the first speed is less than the preset minimum speed.

Figure 7:
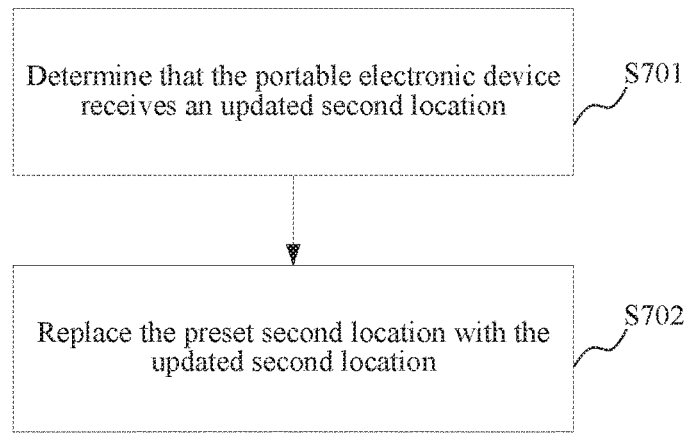
FIG. 7 is a flowchart of a method for triggering an operation according to an embodiment of the present disclosure.

In addition, the preset second location may be updated. Referring to FIG. 7, the method may further include the following steps.

Step S701: Determine that the portable electronic device receives an updated second location.

Step S702: Replace the preset second location with the updated second location.

Figure 8:
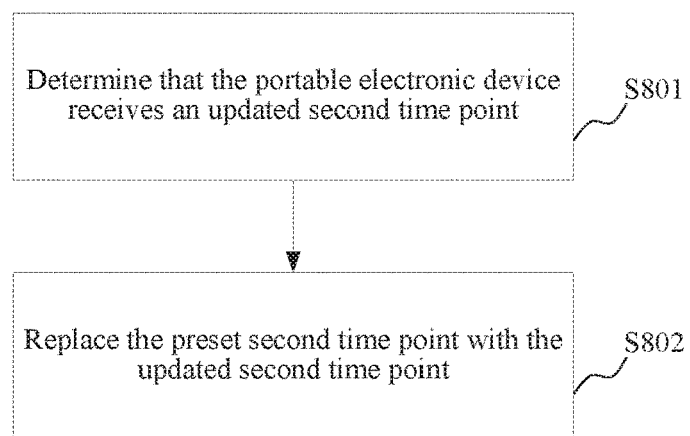
FIG. 8 is a flowchart of a method for triggering an operation according to an embodiment of the present disclosure.

In addition, the preset second time point may be updated. Referring to FIG. 8, the method may further include the following steps.

Step S801: Determine that the portable electronic device receives an updated second time point.

Step S802: Replace the preset second time point with the updated second time point.

The manner for updating the second location or the second time point is not limited in this embodiment. For example, the geo-fencing searches newly received information in WECHAT, Short Message Service, QQ, or other messages regularly or in real time for time and place information, such as the place for gathering and the time for gathering to update the corresponding second location and/or second time point.

The following further describes this embodiment using a specific scenario.

Figure 9:
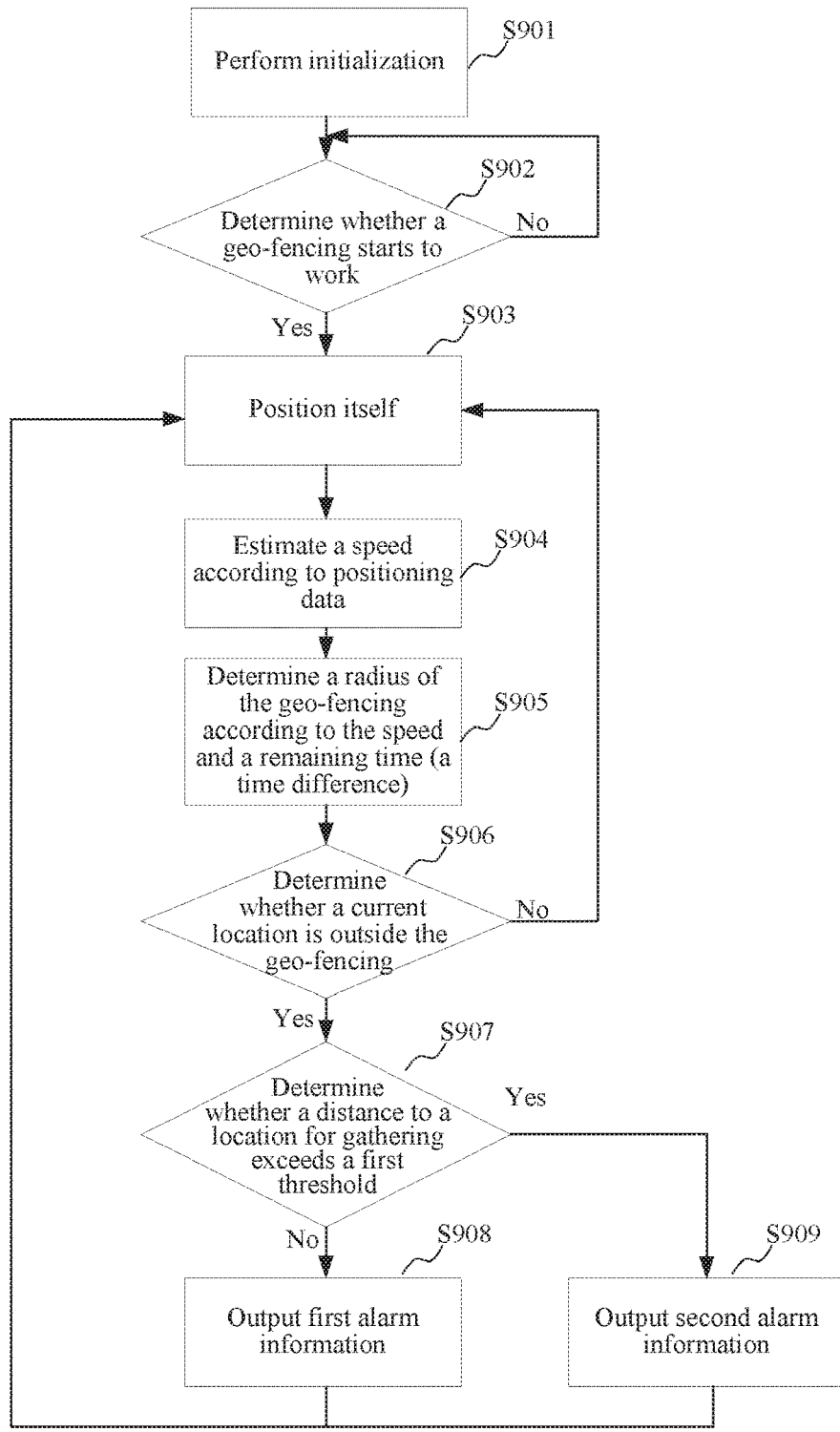
FIG. 9 is a flowchart of a method for triggering an operation according to an embodiment of the present disclosure.

FIG. 9 is a flowchart of a method for triggering an operation according to an embodiment of the present disclosure. The method is executed by a portable electronic device (for example, a mobile phone), and includes the following steps.

Step S901: The portable electronic device performs initialization. For example, a tourist sets on a mobile phone a time point for gathering (for example, 15:30) and a location for gathering. The time point for gathering is the target time point (the second time point), and the location for gathering is the target location (the second location).

Step S902: The portable electronic device determines whether a geo-fencing starts to work. For example, the portable electronic device determines whether a time to be ready for gathering is reached (the time to be ready for gathering may be preset, or the portable electronic device determines whether preset duration before the second time point is reached). If the geo-fencing starts to work, perform step S903, or otherwise, go back to step S902.

Step S903: The portable electronic device positions itself to obtain a current location of the portable electronic device.

Step S904: The portable electronic device estimates a speed according to positioning data.

Step S905: The portable electronic device determines a radius of the geo-fencing according to the speed and a remaining time (a time difference).

Step S906: The portable electronic device determines whether the current location is outside the geo-fencing. If the current location is not outside the geo-fencing, go back to step S903. If the current location is outside the geo-fencing, perform step S907.

Step S907: The portable electronic device determines whether a distance to a location for gathering exceeds a first threshold (for example, twice the reference distance). If the distance to the location for gathering does not exceed the first threshold, perform step S908. If the distance to the location for gathering exceeds the first threshold, perform step S909.

The distance to the location for gathering may include a straight-line distance to the location for gathering, or an actual distance to the location for gathering.

For example, if a map is put aside, that is, impact of a factor such as a specific geographical environment is not considered, the distance to the location for gathering may be considered as a straight line. If impact of a factor such as a specific geographical environment is considered, for example, the tourist needs to detour many buildings and take some winding roads to reach the location for gathering, the distance to the location for gathering is a curve.

Step S908: The portable electronic device outputs first alarm information. Go back to step S903.

Step S909: The portable electronic device outputs second alarm information. Go back to step S903. The current location of the portable electronic device and the second alarm information may further be sent to a mobile phone of a guide.

As described above, the big tree 201 in the front of the park, as shown in FIG. 2 or the location of the mobile phone 301 held by the guide, as shown in FIG. 3 may be set as the location for gathering. In other words, the target location may be stationary, or may move. In addition, when the target location (that is, the second location) is not stationary, for example, the location of the guide is set as the location for gathering, in that case, when the time to be ready for gathering is reached, the geo-fencing starts to work, and the mobile phone of the guide may obtain information about its own location (that is, a third location) in real time or regularly, and determines, according to an offset of the location of the mobile phone with respect to the original location, whether updated information about the second location needs to be sent to a mobile phone of each tourist.

Figure 10:
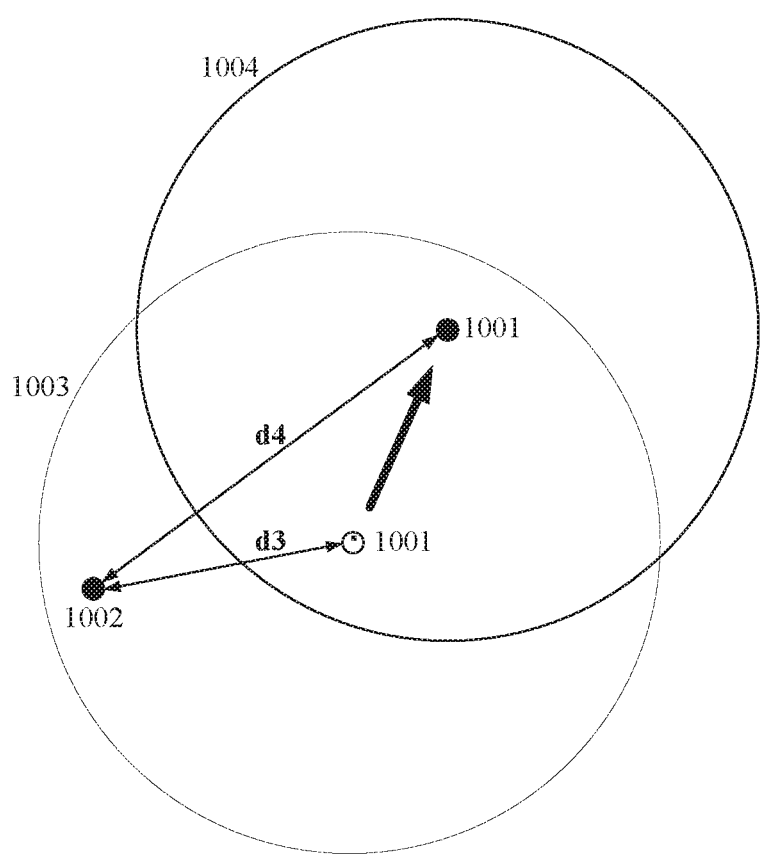
FIG. 10 is a schematic diagram of a geo-fencing according to an embodiment of the present disclosure.

For example, referring to FIG. 10, in FIG. 10, the location of the guide is set as the location for gathering, 1001 is the mobile phone held by the guide, and 1002 is the mobile phone held by the tourist. Before the guide moves, a distance between the tourist and the guide is d3, and the tourist is in a geo-fencing 1003. After the location of the guide moves, the mobile phone held by the tourist re-obtains the location of the guide, that is, the preset second location is updated. In that case, the geo-fencing changes to 1004 accordingly, and the distance between the tourist and the guide changes from d3 to d4, and is outside a range of the new geo-fencing 1004. Therefore, a prompt message should be sent at this time.

Figure 11:
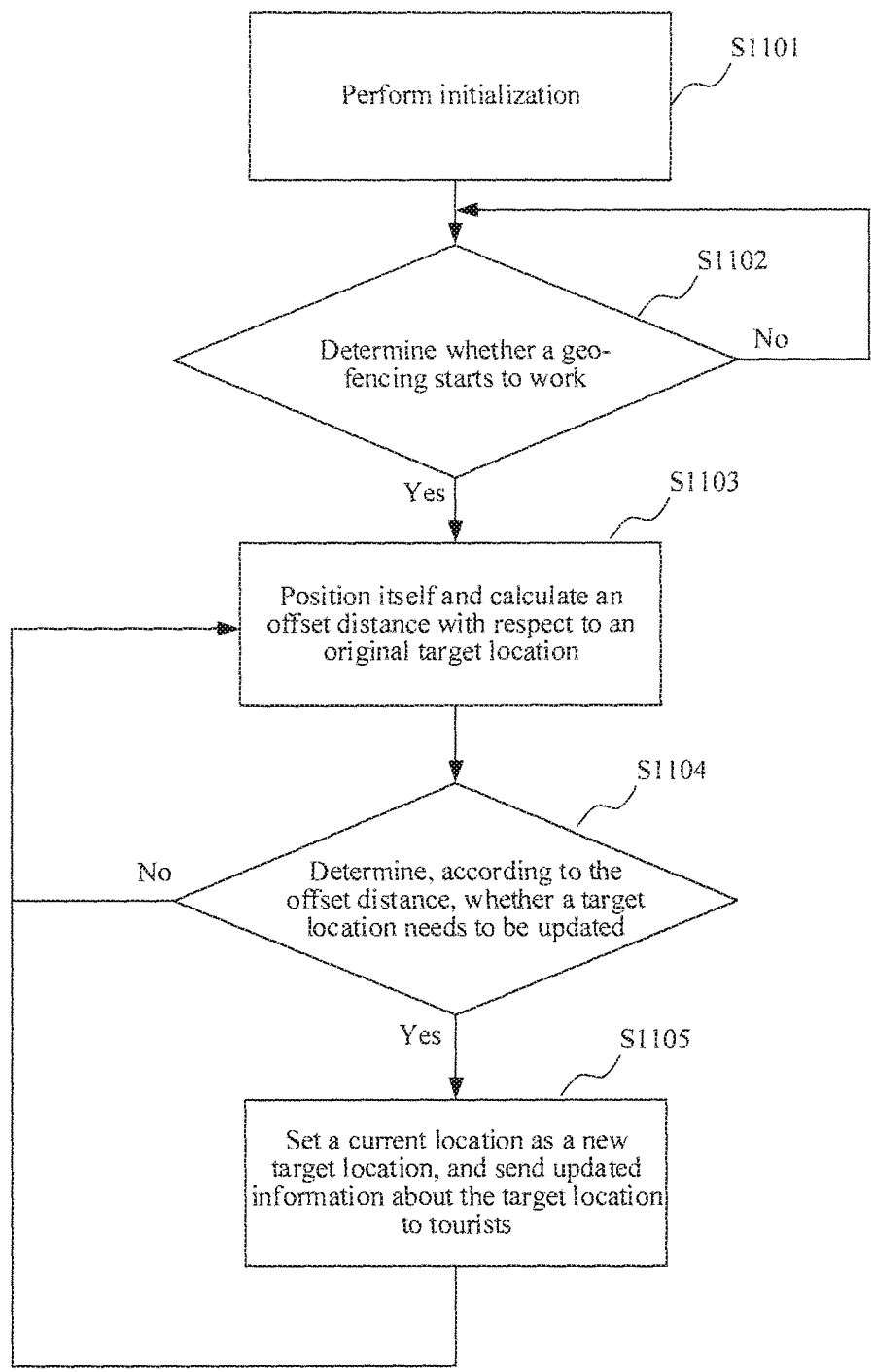
FIG. 11 is a flowchart of a method for triggering an operation according to an embodiment of the present disclosure.

Referring to FIG. 11, FIG. 11 is a flowchart of a method for triggering an operation according to an embodiment of the present disclosure. The method is executed by a portable electronic device (for example, a mobile phone), and includes the following steps.

Step S1101: The portable electronic device performs initialization. For example, a guide sets on a mobile phone a time point for gathering (for example, 15:30) and a location for gathering.

Step S1102: The portable electronic device determines whether a geo-fencing starts to work. For example, the portable electronic device determines whether a time to be ready for gathering is reached (the time to be ready for gathering may be preset, or the portable electronic device determines whether preset duration before the second time point is reached). If the geo-fencing starts to work, perform step S1103, or otherwise, go back to step S1102.

Step S1103: The portable electronic device positions itself, and calculates an offset distance with respect to an original target location.

Step S1104: The portable electronic device determines, according to the offset distance, whether a target location needs to be updated. If the target location does not need to be updated, go back to step S1103. If the target location needs to be updated, perform step S1105.

Step S1105: The portable electronic device sets a current location as a new target location, and sends updated information about the target location to tourists. Go back to step S1103.

Figure 12:
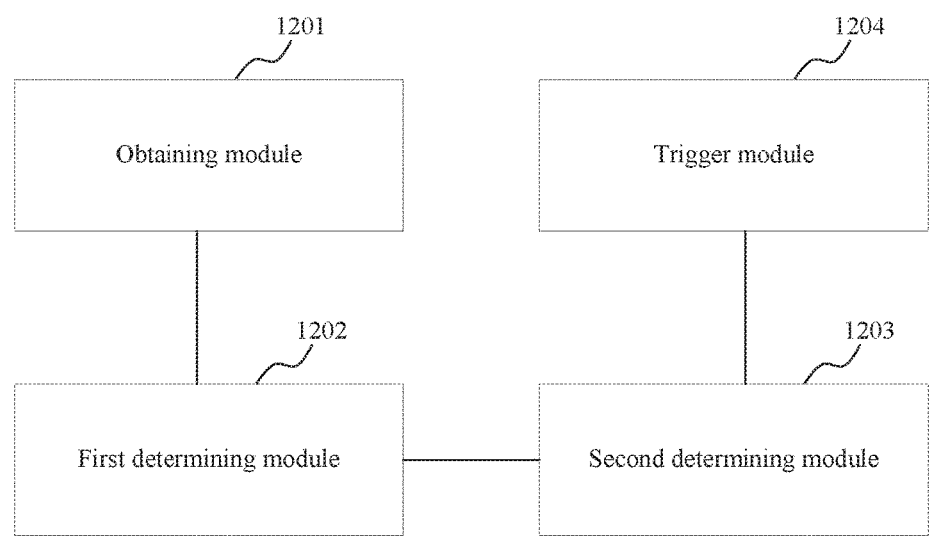
FIG. 12 is a schematic diagram of a portable electronic device according to an embodiment of the present disclosure.

FIG. 12 is a schematic diagram of a portable electronic device according to an embodiment of the present disclosure. The portable electronic device may be a mobile phone or the like. Referring to FIG. 12, the portable electronic device includes an obtaining module 1201 configured to obtain a first speed of the portable electronic device and a first location of the portable electronic device that are at a first time point, a first determining module 1202 configured to determine, according to the first speed and a time difference between a second time point and the first time point, a geo-fencing centering on a second location, where the geo-fencing is a virtual fence including points whose distances to the second location are equal to a reference distance, the reference distance is not greater than a product obtained by multiplying the first speed by the time difference, and the second time point and the second location are preset, a second determining module 1203 configured to determine a location relationship between the first location and the geo-fencing, and a trigger module 1204 configured to trigger a preset operation when the first location is outside the geo-fencing.

In this embodiment or some other embodiments of the present disclosure, the first speed is an instantaneous speed of the portable electronic device at the first time point, or the first speed may be an average speed obtained according to a moving history of the portable electronic device.

In this embodiment or some other embodiments of the present disclosure, the points whose distances to the second location are equal to the reference distance include points whose straight-line distances to the second location are equal to the reference distance, or points whose actual distances to the second location are equal to the reference distance.

Figure 13:
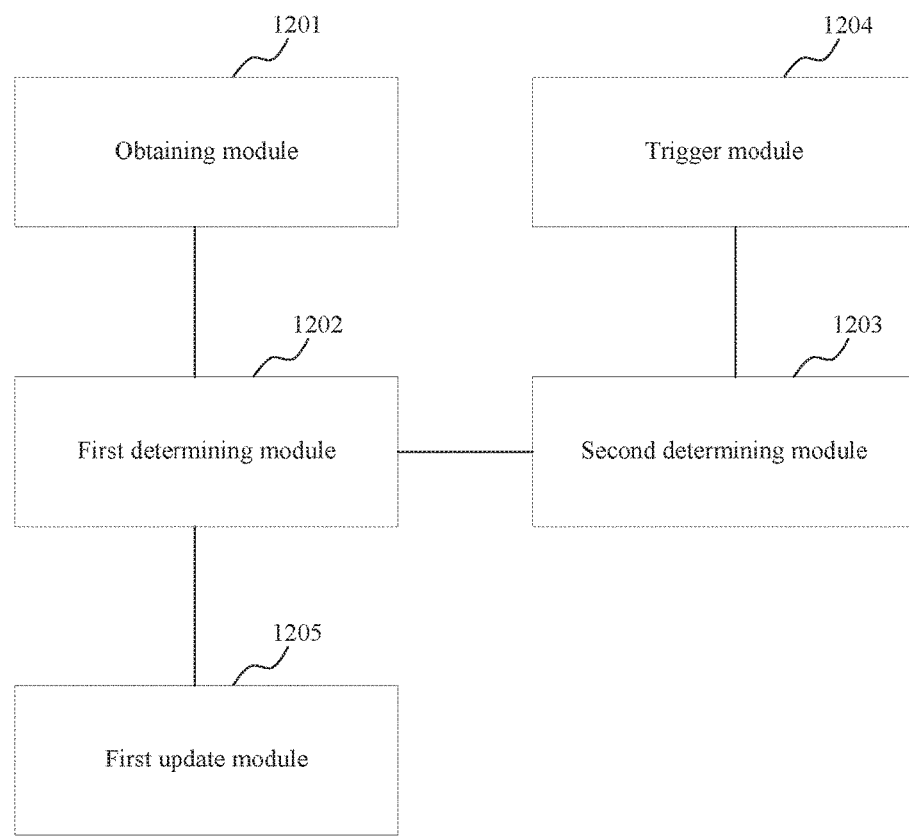
FIG. 13 is a schematic diagram of a portable electronic device according to an embodiment of the present disclosure.

Referring to FIG. 13, in this embodiment or some other embodiments of the present disclosure, the portable electronic device may further include a first update module 1205 configured to determine that the portable electronic device receives an updated second location, and replace the preset second location with the updated second location.

Figure 14:
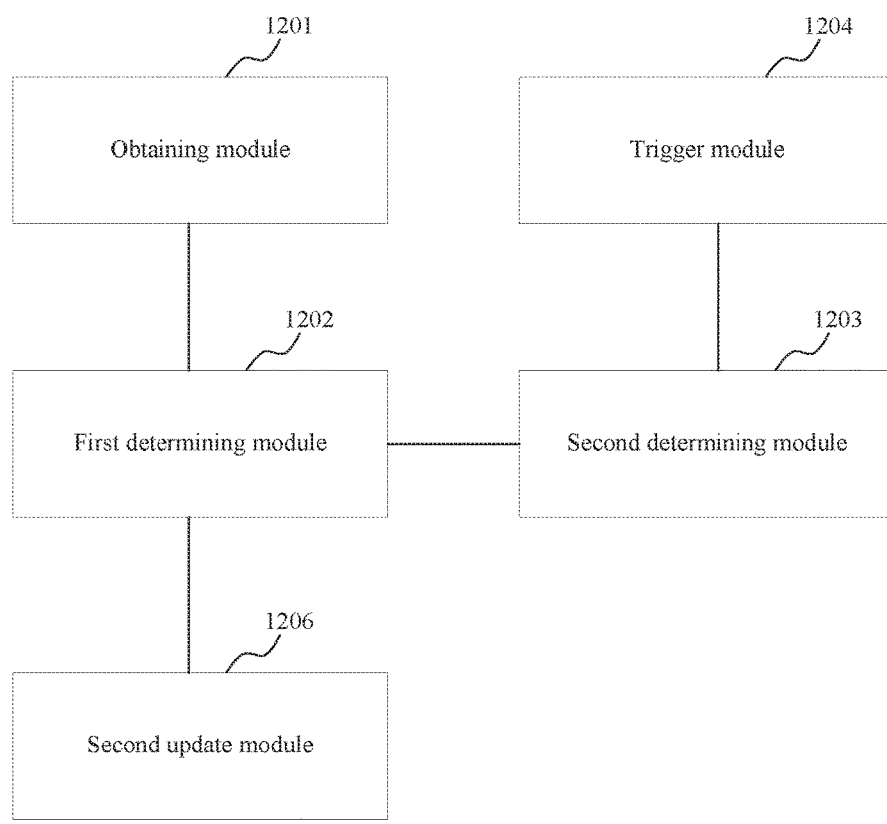
FIG. 14 is a schematic diagram of a portable electronic device according to an embodiment of the present disclosure.

Referring to FIG. 14, in this embodiment or some other embodiments of the present disclosure, the portable electronic device based on FIG. 12 may further include a second update module 1206 configured to determine that the portable electronic device receives an updated second time point, and replace the preset second time point with the updated second time point.

Optionally, the trigger module 1204 includes a first trigger module (not shown) configured to trigger a preset first operation when the first location is outside the geo-fencing and a distance between the first location and the geo-fencing is not greater than a preset threshold, and a second trigger module (not shown) configured to trigger a preset second operation when the first location is outside the geo-fencing and a distance between the first location and the geo-fencing is greater than a preset threshold.

It should be understood that the first operation and the second operation are different, to indicate different levels of prompt messages. For example, the first operation is ringing and displaying an image and a text, and the second operation is ringing, vibrating, and displaying an image and a text.

An embodiment of the present disclosure further provides a portable electronic device, including a processor, a memory, and a system bus, where the memory is connected to the processor using the system bus. The memory is configured to store a computer execution instruction, and the processor is configured to run the computer execution instruction to execute the following method of obtaining a first speed and a first location of the portable electronic device that are at a first time point, determining, according to the first speed and a time difference between a second time point and the first time point, a geo-fencing centering on a second location, where the geo-fencing is a virtual fence including points whose distances to the second location are equal to a reference distance, the reference distance is not greater than a product obtained by multiplying the first speed by the time difference, and the second time point and the second location are preset, determining a location relationship between the first location and the geo-fencing, and triggering a preset operation when determining that the first location is outside the geo-fencing.

In this embodiment or some other embodiments of the present disclosure, the points whose distances to the second location are equal to the reference distance include points whose straight-line distances to the second location are equal to the reference distance, or points whose actual distances to the second location are equal to the reference distance.

In this embodiment or some other embodiments of the present disclosure, the processor may further execute determining that the portable electronic device receives an updated second location, and replacing the preset second location with the updated second location.

In this embodiment or some other embodiments of the present disclosure, the processor may further execute determining that the portable electronic device receives an updated second time point, and replacing the preset second time point with the updated second time point.

In this embodiment or some other embodiments of the present disclosure, the processor may further execute triggering a preset first operation when the first location is outside the geo-fencing and a distance between the first location and the geo-fencing is not greater than a preset threshold, or triggering a preset second operation when the first location is outside the geo-fencing and a distance between the first location and the geo-fencing is greater than a preset threshold.

Figure 15:
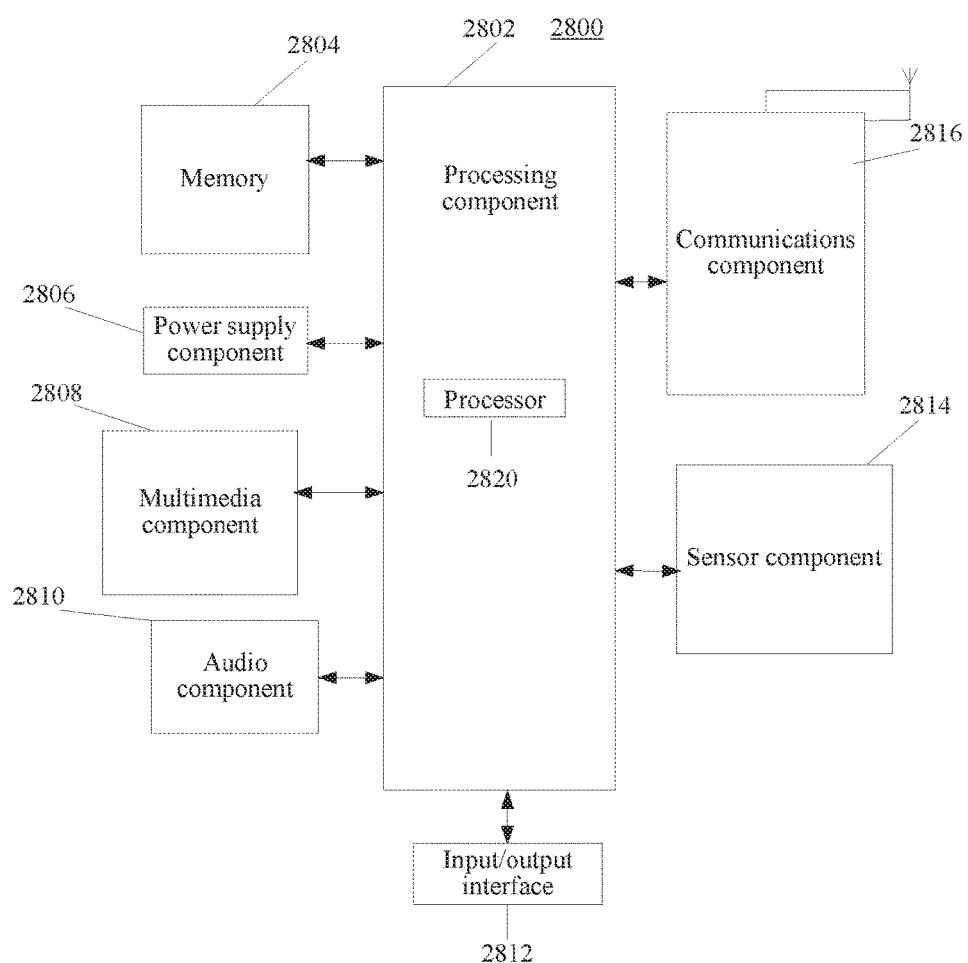
FIG. 15 is a schematic structural diagram of a portable electronic device according to an embodiment of the present disclosure.

For example, for a specific structure of the portable electronic device provided in this embodiment of the present disclosure, refer to FIG. 15. For example, the device 2800 may be a mobile phone, a computer, a digital broadcasting terminal, a message transceiver, a game controller, a tablet device, a medical device, a fitness facility, a personal digital assistant, or the like.

Referring to FIG. 15, the device 2800 may include one or more of the following components a processing component 2802, a memory 2804, a power supply component 2806, a multimedia component 2808, an audio component 2810, an input/output interface 2812, a sensor component 2814, and a communications component 2816.

The processing component 2802 generally controls integral operations of the device 2800, such as operations related to displaying, a phone call, data communication, a camera operation, and a record operation. The processing component 2802 may include one or more processors 2820 to execute instructions in order to complete all or some steps of the foregoing method. In addition, the processing component 2802 may include one or more modules (not shown) to facilitate interaction between the processing component 2802 and other components. For example, the processing component 2802 may include a multimedia module (not shown) to facilitate interaction between the multimedia component 2808 and the processing component 2802.

The memory 2804 is configured to store data of various types to support operations on the device 2800. Examples of the data include instructions of any application program or method that are used for operations on the device 2800, such as contact data, address book data, a message, a picture, and a video. The memory 2804 may be implemented by a volatile or non-volatile storage device of any type or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc.

The power supply component 2806 provides power for various components of the device 2800. The power supply component 2806 may include a power supply management system, one or more power supplies, and other components related to generation, management, and allocation of power for the device 2800.

The multimedia component 2808 includes a screen that is between the device 2800 and a user and that provides an output interface. In some embodiments, the screen may include a liquid crystal display (LCD) and a touch panel (TP). If the screen includes the TP, the screen may be implemented as a touchscreen to receive an input signal from the user. The TP includes one or more touch sensors to sense a touch, a slide, and a gesture on the TP. The touch sensor may not only sense a perimeter of a touch or slide operation, but also detect duration and pressure related to the touch or slide operation. In some embodiments, the multimedia component 2808 includes a front-facing camera and/or a rear-facing camera. When the device 2800 is in an operating mode, such as a shooting mode or a video mode, the front-facing camera and/or the rear-facing camera may receive external multimedia data. The front-facing camera and the rear-facing camera each may be a stationary optical lens system or have capabilities of a focus length and optical zoom.

The audio component 2810 is configured to output and/or input an audio signal. For example, the audio component 2810 includes a microphone (MIC). When the device 2800 is in the operating mode, such as a call mode, a record mode, and a speech recognition mode, the MIC is configured to receive an external audio signal. The received audio signal may further be stored in the memory 2804 or be sent using the communications component 2816. In some embodiments, the audio component 2810 further includes a speaker configured to output an audio signal.

The input/output interface 2812 provides an interface between the processing component 2802 and a peripheral interface module. The peripheral interface module may be a keyboard, a click wheel, a button, or the like. The button may include, but is not limited to a home button, a volume button, a start-up button, and a lock button.

The sensor component 2814 includes one or more sensors configured to provide a status assessment in each aspect for the device 2800. For example, the sensor component 2814 may detect a powered-on/off state of the device 2800 and relative positioning of components. For example, the components are a display and a keypad for the device 2800. The sensor component 2814 may further detect changes in a location of the device 2800 or a component of the device 2800, a touch between the user and the device 2800, an azimuth or acceleration/deceleration of the device 2800 and changes in a temperature of the device 2800. The sensor component 2814 may include a proximity sensor configured to detect an adjacent object without any physical contact. The sensor component 2814 may further include an optical sensor, such as a complementary metal oxide semiconductor (CMOS) or charge-coupled device (CCD) image sensor, used in imaging application. In some embodiments, the sensor component 2814 may further include an acceleration sensor, a gyro sensor, a magnetic sensor, a pressure sensor, or a temperature sensor.

The communications component 2816 is configured to facilitate communication between the device 2800 and other devices in a wired or wireless manner. The device 2800 may access a communications standard-based wireless network, such as WI-FI, second generation (2G), or third generation (3G), or a combination thereof. In an example of an embodiment, the communications component 2816 receives, using a broadcast channel, a broadcast signal or broadcast-related information from an external broadcast management system. In an example of an embodiment, the communications component 2816 further includes a near field communication (NFC) module to facilitate short-distance communication. For example, the NFC module may be implemented based on the radio frequency identification (RFID) technology, the Infrared Data Association (IrDA) technology, the ultra-wideband (UWB) technology, the BLUETOOTH (BT) technology, and other technologies.

In an example of an embodiment, the device 2800 may be implemented using one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, to execute steps S101 to S104 of the method.

An embodiment of the present disclosure further provides a non-transitory computer readable storage medium, including a machine readable instruction stored in the medium, where when executed by a portable electronic device, the machine readable instruction enables the portable electronic device to execute the following events of obtaining a first speed and a first location of the portable electronic device that are at a first time point, determining, according to the first speed and a time difference between a second time point and the first time point, a geo-fencing centering on a second location, where the geo-fencing is a virtual fence including points whose distances to the second location are equal to a reference distance, the reference distance is not greater than a product obtained by multiplying the first speed by the time difference, and the second time point and the second location are preset, determining a location relationship between the first location and the geo-fencing, and triggering a preset operation when determining that the first location is outside the geo-fencing.

Optionally, the points whose distances to the second location are equal to the reference distance include points whose straight-line distances to the second location are equal to the reference distance, or points whose actual distances to the second location are equal to the reference distance.

Optionally, when executed by a portable electronic device, the machine readable instruction may further enable the portable electronic device to execute the following events of determining that the portable electronic device receives an updated second location, and replacing the preset second location with the updated second location.

Optionally, when executed by a portable electronic device, the machine readable instruction may further enable the portable electronic device to execute the following events of determining that the portable electronic device receives an updated second time point, and replacing the preset second time point with the updated second time point.

Optionally, when executed by a portable electronic device, the machine readable instruction may further enable the portable electronic device to execute the following events of triggering a preset first operation when determining that the first location is outside the geo-fencing and a distance between the first location and the geo-fencing is not greater than a preset threshold, or triggering a preset second operation when determining that the first location is outside the geo-fencing and a distance between the first location and the geo-fencing is greater than a preset threshold.

It is understandable that the present disclosure may be applicable to environments or configurations of multiple universal or dedicated computing systems. For example, a personal computer, a server computer, a handheld device or a portable device, a flat panel device, a multi-processor system, a microprocessor-based system, a set-top box, a network personal computer (PC), a minicomputer, a mainframe computer, and a distributed computing environment including any one of the foregoing system or device.

The present disclosure can be described in the general context of executable computer instructions executed by a computer, for example, a program module. Generally, the program unit includes a routine, program, object, component, data structure, and the like for executing a particular task or implementing a particular abstract data type. The present disclosure may also be practiced in distributed computing environments in which tasks are performed by remote processing devices that are connected using a communications network. In a distributed computing environment, program modules may be located in both local and remote computer storage media including storage devices.

It should be noted that in this specification, relational terms such as first and second are only used to distinguish one entity or operation from another, and do not necessarily require or imply that any actual relationship or sequence exists between these entities or operations. Moreover, the terms "include," "comprise," or their any other variant is intended to cover a non-exclusive inclusion such that a process, a method, an article, or an apparatus that includes a list of elements not only includes those elements but also includes other elements which are not expressly listed, or further includes elements inherent to such process, method, article, or apparatus. An element proceeded by "includes a . . . " does not, without more constraints, preclude the existence of additional identical elements in the process, method, article, or apparatus that includes the element.

The foregoing descriptions are merely specific implementation manners of the present disclosure. It should be noted that a person of ordinary skill in the art may make several improvements or polishing without departing from the principle of the present disclosure and the improvements or polishing shall fall within the protection scope of the present disclosure.

What is claimed is:

1. A method for triggering an operation, comprising:
obtaining a first speed of a portable electronic device and a first location of the portable electronic device that are at a first time point;
determining, according to the first speed and a time difference between a second time point and the first time point, a geo-fence centered on a second location, the geo-fence comprising a virtual fence comprising points where distances to the second location are equal to a reference distance, the reference distance not being greater than a product obtained by multiplying the first speed by the time difference, the second time point and the second location are preset, and the points where the distances to the second location are equal to the reference distance comprising points where straight-line distances to the second location are equal to the reference distances;
determining a location relationship between the first location and the geo-fence; and
triggering a preset operation when the first location is located outside the geo-fence.

2. The method of claim 1, wherein the points where the distances to the second location are equal to the reference distance comprise points where actual distances to the second location are equal to the reference distance.

3. The method of claim 1, further comprising:
determining that the portable electronic device receives an updated second location; and
replacing the preset second location with the updated second location.

4. The method of claim 1, further comprising:
determining that the portable electronic device receives an updated second time point; and
replacing the preset second time point with the updated second time point.

5. The method of claim 1, wherein triggering the preset operation when the first location is located outside the geo-fence comprises triggering a preset first operation when the first location is located outside the geo-fence and a distance between the first location and the geo-fence is not greater than a preset threshold.

6. The method of claim 1, wherein triggering the preset operation when the first location is located outside the geo-fence comprises triggering a preset second operation when the first location is located outside the geo-fence and a distance between the first location and the geo-fence is greater than a preset threshold.

7. A portable electronic device, comprising:
one or more processors;
a memory coupled to the one or more processors and configured to store one or more programs comprising an instruction, the instruction causing the one or more processors to be configured to:
obtain a first speed of the portable electronic device and a first location of the portable electronic device that are at a first time point;
determine, according to the first speed and a time difference between a second time point and the first time point, a geo-fence centered on a second location, the geo-fence comprising a virtual fence comprising points where distances to the second location are equal to a reference distance, the reference distance not being greater than a product obtained by multiplying the first speed by the time difference, the second time point and the second location are preset, and the points where the distances to the second location are equal to the reference distance comprise points where straight-line distances to the second location are equal to the reference distance;
determine a location relationship between the first location and the geo-fence; and
trigger a preset operation when the first location is located outside the geo-fence.

8. The portable electronic device of claim 7, wherein the points where the distances to the second location are equal to the reference distance comprise points where actual distances to the second location are equal to the reference distance.

9. The portable electronic device of claim 7, wherein the instruction further causes the one or more processors to be configured to:
determine that the portable electronic device receives an updated second location; and
replace the preset second location with the updated second location.

10. The portable electronic device of claim 7, wherein the instruction further causes the one or more processors to be configured to:
determine that the portable electronic device receives an updated second time point; and
replace the preset second time point with the updated second time point.

11. The portable electronic device of claim 7, wherein when triggering the preset operation, the instruction further causes the one or more processors to be configured to trigger a preset first operation when the first location is located outside the geo-fence and a distance between the first location and the geo-fence is not greater than a preset threshold.

12. The portable electronic device of claim 7, wherein when triggering the preset operation, the instruction further causes the one or more processors to be configured to trigger a preset second operation when the first location is located outside the geo-fence and a distance between the first location and the geo-fence is greater than a preset threshold.

13. A non-transitory computer readable storage medium storing one or more programs, the one or more programs comprising an instruction that when executed by a portable electronic device comprising a display and a plurality of application programs, the instruction enables the portable electronic device to implement the following operations:
obtaining a first speed of the portable electronic device and a first location of the portable electronic device that are at a first time point;
determining, according to the first speed and a time difference between a second time point and the first time point, a geo-fence centered on a second location, the geo-fence comprising a virtual fence comprising points where distances to the second location are equal to a reference distance, the reference distance not being greater than a product obtained by multiplying the first speed by the time difference, the second time point and the second location are preset, and the points where the distances to the second location are equal to the reference distance comprising points that straight-line distances to the second location are equal to the reference distance; determining a location relationship between the first location and the geo-fence; and
triggering a preset operation when the first location is located outside the geo-fence.

14. The non-transitory computer readable medium of claim 13, wherein the points that the distances to the second location are equal to the reference distance comprise points that actual distances to the second location are equal to the reference distance.

15. The non-transitory computer readable medium of claim 13, wherein the instruction further enables the portable electronic device to implement the following operations:
determining that the portable electronic device receives an updated second location; and
replacing the preset second location with the updated second location.

16. The non-transitory computer readable medium of claim 13, wherein the instruction further enables the portable electronic device to implement the following operations:
determining that the portable electronic device receives an updated second time point; and
replacing the preset second time point with the updated second time point.

17. The non-transitory computer readable medium of claim 13, wherein when triggering the preset operation, the instruction further enables the portable electronic device to implement the following operations:
triggering a preset first operation when the first location is located outside the geo-fence and a distance between the first location and the geo-fence is not greater than a preset threshold; or triggering a preset second operation when the first location is located outside the geo-fence and the distance between the first location and the geo-fence is greater than the preset threshold.

\* \* \* \* \*